United States Patent

Rosen et al.

[11] Patent Number: 4,526,065
[45] Date of Patent: Jul. 2, 1985

[54] AUTOMATIC TRANSMISSION BRAKE-NEUTRAL CONTROL CIRCUIT

[75] Inventors: Stanley D. Rosen, Southfield; William D. Ross, Harbor Springs, both of Mich.

[73] Assignee: Ford Motor Company, Dearborn, Mich.

[21] Appl. No.: 441,594

[22] PCT Filed: Sep. 20, 1982

[86] PCT No.: PCT/US82/01301
§ 371 Date: Sep. 20, 1982
§ 102(e) Date: Sep. 20, 1982

[87] PCT Pub. No.: WO84/01131
PCT Pub. Date: Mar. 29, 1984

[51] Int. Cl.³ .............................................. B60K 41/16
[52] U.S. Cl. ........................................ 74/869; 74/867; 74/868
[58] Field of Search ................ 74/866, 867, 868, 869, 74/878

[56] References Cited

U.S. PATENT DOCUMENTS

| | | | |
|---|---|---|---|
| 2,608,880 | 9/1952 | Flinn | 74/866 X |
| 3,667,322 | 6/1972 | Noguchi et al. | 74/868 X |
| 4,105,101 | 8/1978 | Förster et al. | 74/846 X |
| 4,298,109 | 11/1981 | Dörpmund et al. | 192/44 X |
| 4,313,353 | 2/1982 | Honig | 74/867 X |
| 4,331,045 | 5/1982 | Piech et al. | 74/867 |

FOREIGN PATENT DOCUMENTS

| | | | |
|---|---|---|---|
| 0029290 | 5/1981 | European Pat. Off. | 74/867 |
| 2363762 | 6/1975 | Fed. Rep. of Germany | 74/867 |
| 2545798 | 4/1977 | Fed. Rep. of Germany | 74/867 |
| 3019274 | 11/1981 | Fed. Rep. of Germany | 74/866 |

Primary Examiner—George H. Krizmanich
Assistant Examiner—Dirk Wright
Attorney, Agent, or Firm—Donald J. Harrington; Keith L. Zerschling

[57] ABSTRACT

An automatic transmission control circuit having a hydrokinetic torque converter and planetary gearing in a torque delivery driveline wherein provision is made for interrupting the torque delivery and interrupting a driving connection between the engine and the gearing where the vehicle is operated at a speed less than a minimum value and the vehicle brakes are applied thereby improving exhaust emissions from the engine and improving fuel economy during idling and eliminating the tendency for the vehicle to creep when the vehicle is standing.

7 Claims, 4 Drawing Figures

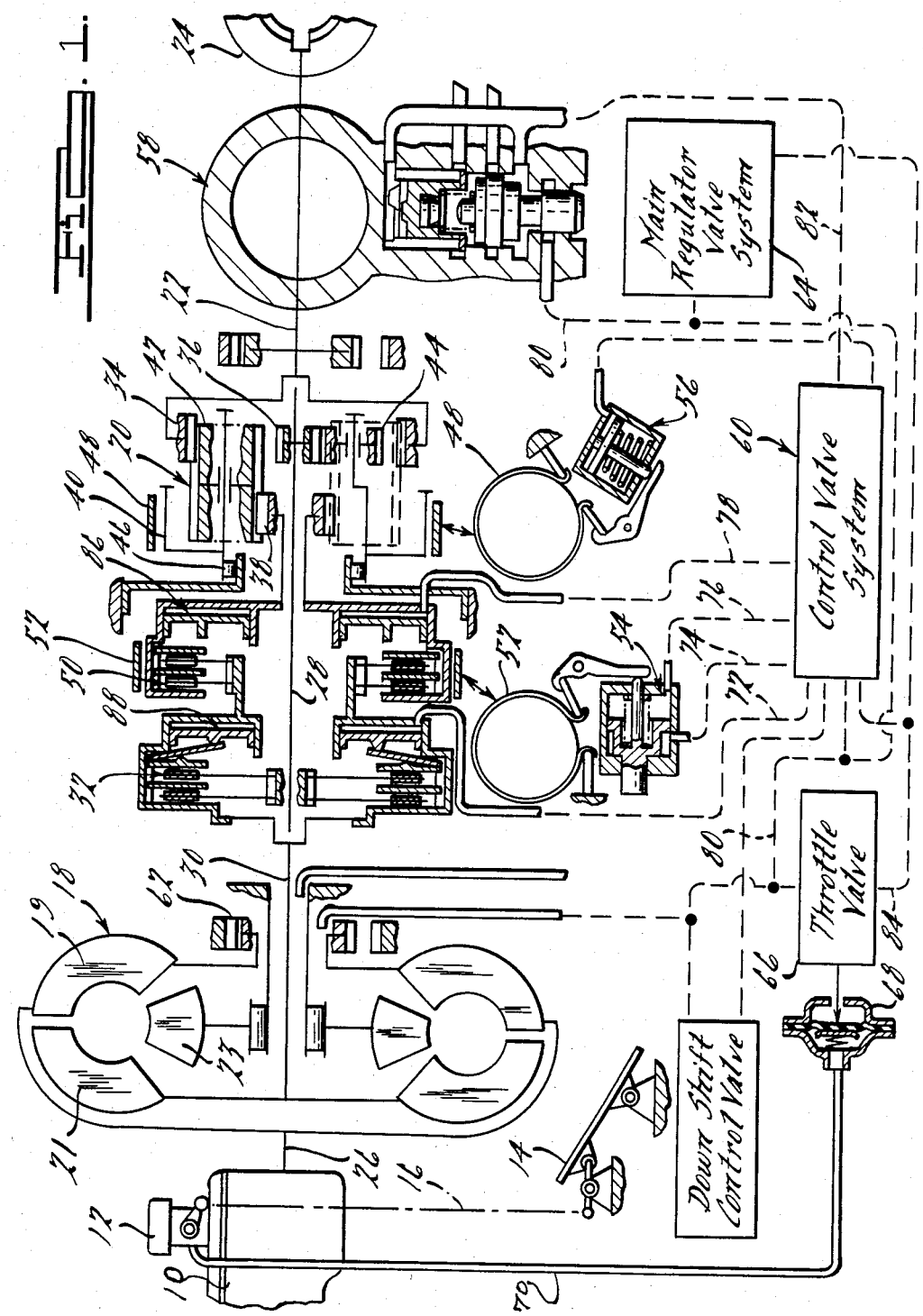

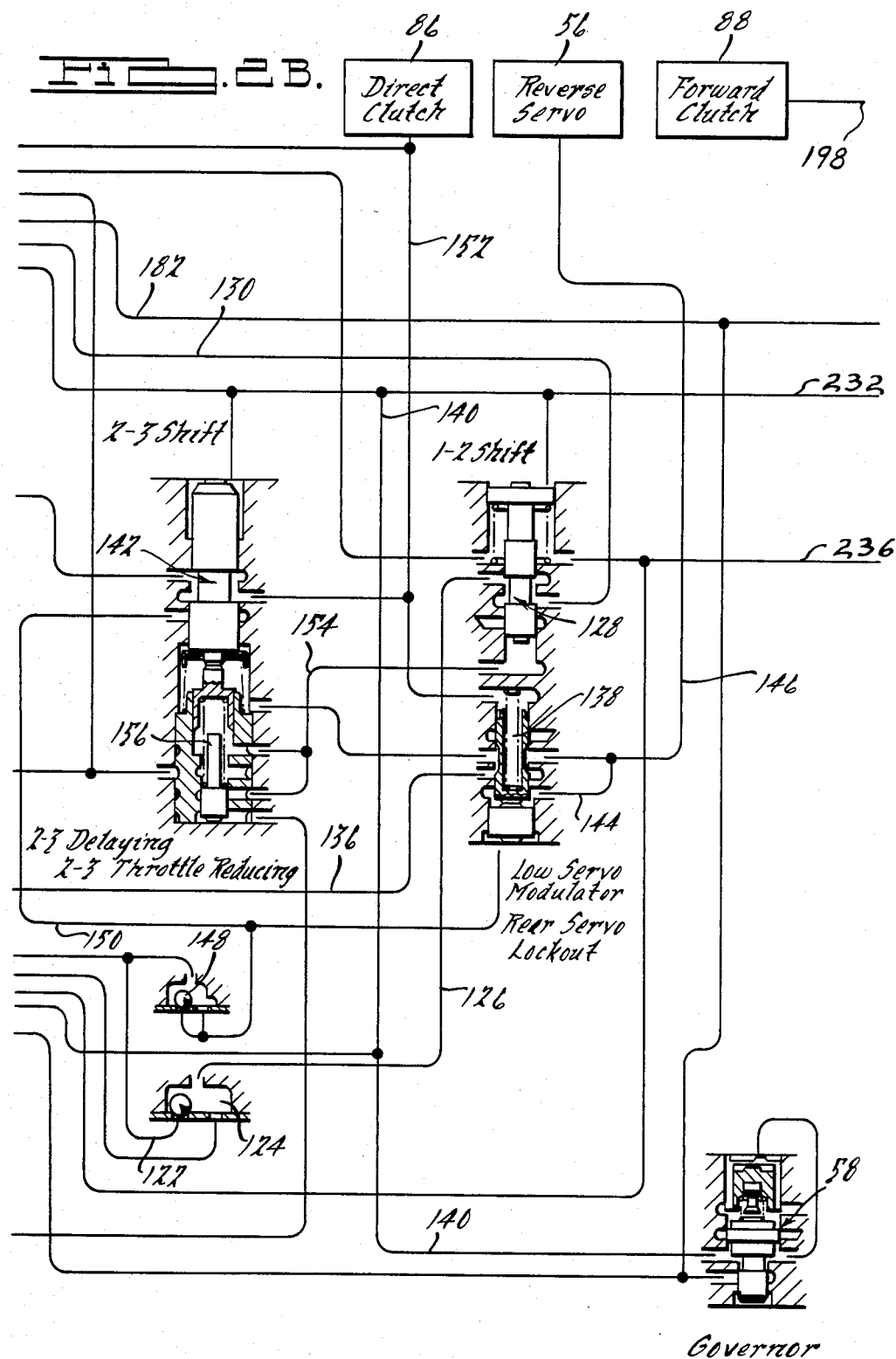

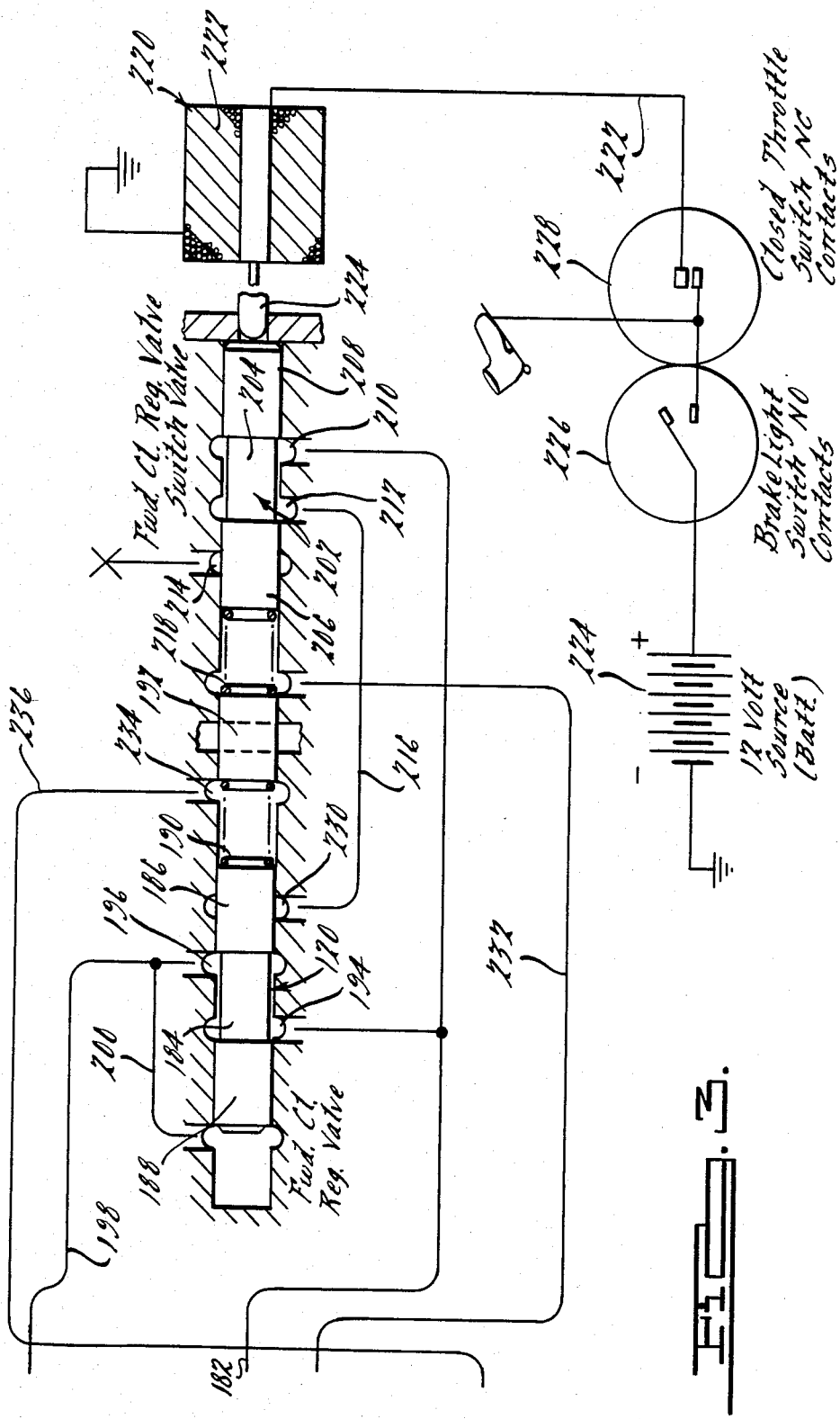

AUTOMATIC TRANSMISSION BRAKE-NEUTRAL CONTROL CIRCUIT

TECHNICAL FIELD

This invention relates to automatic power transmission mechanisms for automotive vehicle drivelines. It relates more particularly to a control valve circuit that controls the engagement and disengagement of a forward drive clutch in the gearing for the driveline to interrupt the torque delivery connection between the engine and the traction wheels when the vehicle brakes are applied and the vehicle is either standing or operating at a speed less than a predetermined value.

BACKGROUND ART

Our invention is adapted to be used in automatic transmission for automotive vehicles employing a hydrokinetic torque converter and multiple ratio gearing. Such converter and gearing arrangements may be disposed in either an inline arrangement wherein the output shaft is coaxially disposed with respect to the axis of the converter and with respect to the crankshaft of the engine or in a transaxle arrangement wherein the engine and converter are located on one axis and the output elements of the gearing are mounted for rotation about a transverse axis. In either case engine torque is delivered to the impeller of the converter and the turbine of the converter acts as a driver for the torque input elements of the gearing. Fluid pressure operated brakes are employed for establishing reaction points for the gearing and multiple fluid operated clutches are employed for establishing a connection between the turbine and selected torque input elements of the gearing.

Such control systems employ a fluid pressure pump driven by the engine and a control circuit that responds to engine torque and vehicle speed to effect engagement and disengagement of the clutches and brakes. It is usual practice for the turbine to remain connected to the torque input element that establishes a low speed ratio condition in the gearing when the vehicle is brought to a stop by applying the vehicle brakes although the magnitude of the torque delivered through the converter is low when the vehicle is stopped and the engine is idling, a minimal torque delivery to the traction wheels nevertheless is established which tends to cause the vehicle to creep. The engine, furthermore, must overcome the load imposed on it because of this residual torque transfer; and this is done at the expense of engine fuel economy and the quality of engine exhaust gas emissions.

The improvement of our invention makes it possible to disconnect the turbine from the torque input elements of the gearing when the engine is idling and the vehicle is stopped or when the vehicle is braked while the vehicle is traveling at a speed less than the selected minimum value. This is accomplished by the use of valve components that disengage the friction clutch between the turbine and the torque input element of the gearing but that allows for a threshold pressure to remain in the servo for the clutch so that a subsequent engagement of the clutch will occur instantaneously upon depression of the engine carburetor throttle during vehicle startup.

We are aware of various prior art teachings that relate to the general concept of establishing a neutral-idle condition in a vehicle driveline. Examples of these are shown in U.S. Pat. No. 2,608,880 (Flinn) wherein a transmission control functions to interrupt torque delivery through a powertrain when the vehicle brakes are applied and the speed of the transmission tailshaft is below a certain value. Provision is made by Flinn for maintaining the powertrain in a torque delivery condition even though the accelerator is returned to its closed position without reference to application of the brakes when the speed is above the designed value.

Another example of prior art having a neutral-idle condition is the circuit shown in U.S. Pat. No. 4,298,109 (Dorpmund et al). That reference shows a main control valve between an automatic transmission low speed ratio clutch which responds to governor pressure and to a torque dependent pressure to deliver control pressure directly to the clutch when the governor pressure and the torque dependent pressure are sufficient to overcome the force of the valve spring. When the brakes are applied, however, a solenoid valve is actuated thereby eliminating the influence of the torque dependent pressure. The control valve responds to that loss of torque dependent pressure by exhausting of the pressure in the clutch as the spring overcomes the force of the remaining governor pressure. The control valve spring produces a predominant valve force only if both of the opposing control pressures are available to the control valve. Speed sensitive pressure alone is sufficient to overcome the spring force when the vehicle speed exceeds a predetermined value. Whenever the spring overcomes the combined forces of the speed and torque signals, the clutch is opened to exhaust and thus disengages.

Another example of a neutral-idle control system is shown in U.S. Pat. No. 4,105,101, which includes a regulator valve for controlling the application of a clutch or brake used to establish a low speed ratio drive. The valve is controlled by a solenoid valve that responds to application of the vehicle brakes and accelerator pedal displacement to open an exhaust flow path for the clutch or brake, the exhaust flow path including a calibrated flow restricting orifice between the control valve and the solenoid valve. The regulator valve for the brake that establishes a low speed ratio condition maintains a residual pressure in the brake. A brake switch and a speed sensitive switch arranged in series causes the solenoid valve to be actuated when the brakes are applied and the engine throttle is closed. The solenoid valve will remain energized even after the brakes are released if the speed is lower than the design limit or if the vehicle is stopped and the engine throttle remains closed. A holding circuit achieves this function.

U.S. Pat. No. 4,331,045 shows still another neutral-idle control which comprises a speed governor sensitive control valve (main control valve) and an accelerator controlled purging valve for controlling the effect of a load dependent pressure on the control valve.

DISCLOSURE OF THE INVENTION

The neutral-idle control system of our invention is an electrical-mechanical-hydraulic system that is adaptable for use in existing automatic transmission control valve circuits in combination with the transmission manual valve that selects the operating range of the automatic transmission and the governor valve. It includes a forward clutch regulator valve that normally acts under the influence of a valve spring to form a direct fluid connection between a control circuit pressure line and the forward clutch when the manual valve is in the automatic drive range position, as distinct from the reverse drive position or the position that corresponds to continuous operation in one or the other of the underdrive ratios. The regulator valve is subjected directly to the governor pressure supplied by the automatic transmission governor valve assembly. A solenoid valve opens and closes an exhaust port for the regulator valve to render active the regulator valve when the brakes are applied and the engine throttle is closed and to pressurize the exhaust port when either the brakes are released or the engine throttle is opened thereby interrupting the pressure regulating action of the forward clutch regulator valve. The solenoid valve function is opposed by governor pressure so that it becomes ineffective regardless of the condition of the wheel brakes or the engine throttle when the vehicle road speed is higher than a predetermined value. Thus the regulator valve exhaust port remains pressurized under that condition regardless of whether the operator applies the wheel brakes or whether he opens the engine throttle.

BRIEF DESCRIPTION OF THE DRAWINGS

FIG. 1 is a schematic drawing of a power transmission mechanism for an automotive vehicle including a control valve system that may embody the improvements of this invention.

FIG. 2B is a partial schematic drawing of a control valve system for controlling the clutches and brakes of the transmission mechanism of FIG. 1. It is a continuation of FIG. 2A.

FIG. 3 shows the details of the neutral-idle valve elements acting in cooperation with the valve elements shown in FIGS. 2A and 2B. It is a continuation of FIGS. 2A and 2B.

BEST MODE FOR CARRYING OUT THE INVENTION

Figure 2A:
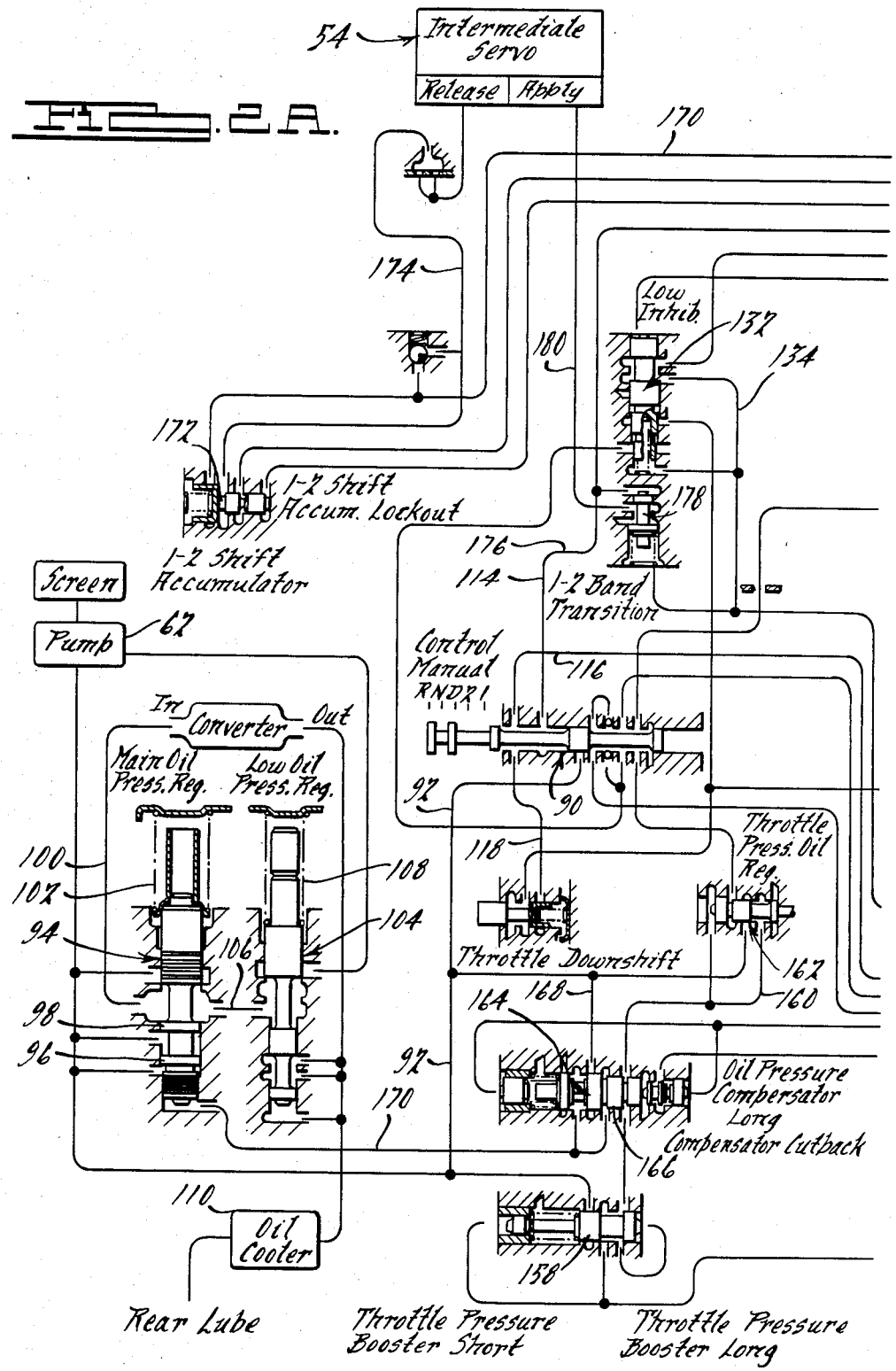
FIG. 2A is a partial schematic drawing of a control valve system for controlling the clutches and brakes of the transmission mechanism of FIG. 1.

In FIG. 1 numeral 10 designates an internal combustion engine for an automotive vehicle. It comprises an engine carburetor 12 having a throttle valve that is controlled by an accelerator pedal 14 connected to the throttle by throttle linkage 16.

The transmission mechanism in FIG. 1 comprises a hydrokinetic torque converter 18, planetary gearing 20 and a driven shaft 22 which is connected to the vehicle traction wheels 24 through a driveshaft and a differential and axle assembly, not shown.

The converter 18 comprises a bladed impeller 19, a bladed turbine 21 and a bladed stator 23 disposed in toroidal fluid flow relationship. The impeller 19 is connected drivably to the crankshaft 26 of the engine 10.

Intermediate transmission shaft 28 is adapted to be connected to turbine shaft 30 through a pressure operated forward clutch 32. Turbine shaft 30 is connected drivably to turbine 21.

The planetary gear unit 20 comprises a ring gear 34, a small sun gear 36, a large sun gear 38 and a planetary carrier 40. Long planet pinions 42 journalled on the carrier 40 mesh with short planet pinions 44 which in turn drivably engage sun gear 36. Long planet pinions 42 engage also ring gear 34 and sun gear 38. Overrunning brake 46 anchors the carrier 40 against rotation during low speed ratio operation thus providing a torque reaction point. Friction brake band 48 also may be used to anchor the carrier 40 during reverse drive operation, thus providing continuous operation in the lowest underdrive ratio when engine braking is desired.

A high speed ratio clutch 50 is adapted, when it is applied, to connect sun gear 38 to the turbine shaft 30. Sun gear 38 also may be braked by intermediate speed ratio brake band 52. Brakes 52 and 48 can be applied and released by fluid pressure operated servos shown schematically at 54 and 56. The fluid pressure operated governor valve assembly 58 is connected drivably to power output shaft 22 and is adapted to provide a speed signal that is dependent upon the speed of rotation of the shaft 22.

The control valve circuit for controlling the application and release of the clutches and brakes of the embodiment of FIG. 1 is schematically illustrated at 60. Pressure for the control circuit is made available by an engine driven pump 62. The magnitude of the circuit pressure made available to the control system 60 by the pump 62 is regulated by a main regulator valve system 64, and a torque sensitive signal pressure is made available to the control system 60 by a throttle valve schematically illustrated at 66 in FIG. 1. The throttle valve responds to a vacuum actuator 68 which is connected through a pneumatic pressure passage 70 with the throat of carburetor 12 so that it responds to engine intake manifold pressure to produce a throttle pressure signal for the control system. Governor pressure is distributed directly from the governor valve assembly 58 to the control system 60, which responds to differential forces developed by the governor pressure and the throttle pressure to deliver selectively clutch-and-brake actuating pressure to the feedlines 72, 74, 76 and 78. The control valve system includes a pressure regulator valve which controls the pressure developed by pump 62 in line pressure passage 80. Governor pressure is distributed to the valve system 60 through passage 82 and throttle pressure from the throttle valve 66 is delivered to the control system and to the main regulator valve system 64 through passage 84.

Forward clutch 32 is applied during operation in each of the three forward driving speed ratios. With the clutch 32 applied, torque is delivered from the turbine shaft 30 to the intermediate shaft 28 and to the sun gear 36. Ring gear 34 and the output shaft 22 are driven at a reduced ratio as the carrier 40 serves as a reaction member. The carrier is anchored by overrunning brake 46 during normal forward drive operation although the brake 48, which is applied during manual-low forward driving operation, also delivers reaction torque to the transmission case to prevent overrunning of the brake 46 during coasting in the low ratio.

A ratio change from the low ratio to the intermediate ratio is achieved by releasing the brake 48 if it is applied and applying the brake 52, which anchors large sun gear 38. Ring gear 34 continues to serve as a torque output element and the overrunning brake 46 freewheels as intermediate underdrive ratio is established.

A ratio change from the intermediate underdrive ratio to a high-speed, direct drive ratio is achieved by releasing the brake 52 and applying the clutch 50 as the forward clutch 32 remains applied. The lockup elements of the gearing for rotation in unison thus establishing a direct driving connection between the turbine shaft 30 and the output shaft 22.

Reverse drive is obtained by releasing the forward clutch 32 and applying the clutch 50 and the carrier brake 48. This allows the carrier to act as a reaction point as torque from the turbine is delivered through the clutch 50 to the large sun gear 38, thus driving the ring gear 34 in a reverse direction.

FIGS. 2A and 2B show in schematic form the portion of a control system that is capable of controlling the engagement and release of the clutches and brakes shown schematically in FIG. 1. For a more complete understanding of the mode of operation of the control circuit of FIGS. 2A and 2B, reference may be made to earlier patents issued to Duffy and Searles, U.S. Pat. Nos. 3,272,029 and 3,158,037, respectively, which are owned by the assignee of this invention. This invention is an improvement in the control circuits described in the Duffy and Searles patents.

FIG. 3 is an enlargement of another portion of the control circuit. It shows in particular a forward clutch regulating valve and switch valve, a brake light switch, a closed throttle switch and a valve actuating solenoid.

The direct clutch servo for the clutch 50 is identified in FIG. 2B as the direct clutch 86. The corresponding forward clutch servo for the clutch 32 is identified in FIG. 3 by reference character 88.

The intermediate brake servo 54 comprises a double acting piston which cooperates with a cylinder as seen in FIG. 1 to define opposed pressure chambers. When both chambers are pressurized, the brake assumes a release condition. When the release side of the servo, which corresponds to the right hand side of the piston shown in FIG. 1, is exhausted, the intermediate servo becomes applied.

Pressure from the pump 62 is supplied to a control manual valve 90, shown in FIG. 2A, through passage 92. The pressure in passage 92 is regulated by the main oil pressure regulator valve 94. This valve has a high pressure land 96 in communication with the high pressure side of the pump and a companion land 98 which communicates with a low pressure converter feed passage 100. The feedback pressure forces acting in an upward direction on the regulator valve 94 are opposed by valve spring 102.

The converter pressure itself is regulated by a low oil pressure regulator valve 104 located on the outlet side of the converter. Bypass fluid from the main regulator valve 94 is distributed to the low oil pressure regulator through cross-over passage 106, which develops a pressure force that opposes the force of valve spring 108. That pressure force is supplemented by the pressure force created by the pressure at the outlet of the converter on the upstream side of the oil cooler 110, which in turn drains to the transmission lubrication circuit.

The control manual valve has five operating positions indicated in FIG. 2A by reference symbols R, N, D, 2, and 1. These respectively refer to the reverse position, the neutral position, the drive or automatic drive range position, the second speed ratio range position and the first speed ratio range position. When the valve 90 is in the "2" position, automatic upshifts from the intermediate ratio to the high speed ratio are prevented. The transmission then is in condition for continuous operation in the intermediate underdrive ratio and is effective to transmit coasting torque. When the control manual valve 90 is in the "1" position and the vehicle is operating at a speed greater than a preselected shift point speed, the transmission initially will assume the intermediate drive range position; and as the vehicle speed decreases (for example, during coasting) to a value less than the calibrated shift point speed, a downshift to the low ratio will occur as the brake servo 56 becomes applied.

For purposes of this description it will be assumed that the control manual valve will have been adjusted to the "D" position thus permitting automatic upshifts to occur as well as automatic downshifts, and each of the three driving ratios in a forward driving direction is available.

Passage 114 is supplied with pressure from passage 92 through the control manual valve when the manual valve is in the "D" position. It is pressurized also when the manual valve is in either the "1" position or "2" position. Passages 116 and 114 also are supplied with control pressure from the manual valve when the manual valve is in the "D" position. Passage 94 extends to port A of the forward clutch regulating valve 120 shown in FIG. 3.

Passage 116 supplies control pressure through passage 122 and through 3-way check valve 124 to passage 126, which in turn feeds the 1-2 shift valve 128. When the 1-2 shift valve is positioned as shown, pressure is distributed to it from passage 126 to passage 130, through the low inhibitor valve 132 to passage 134, to passage 136 and through the low servo modulator valve 138 to the low-and-reverse servo 56. That causes the low-and-reverse servo to become applied. During normal automatic drive range operation, as explained previously, the transmission is in condition for low speed ratio operation as the overrunning brake 46 distributes reaction torque to the transmission housing.

The 1-2 shift valve is subjected to governor pressure developed by the governor 58 and distributed to passage 140. The pressure in governor passage 140 acts on the upper end of the 1-2 shift valve and on the upper end of 2-3 shift valve 142. It acts also on low inhibitor valve 132 so that downshifts in the low ratio cannot be achieved if the vehicle is operating at speeds in excess of a calibrated value.

The low servo modulator valve 138 has a servo feedback passage 144 which allows the valve to maintain a regulated value of pressure in passage 146, which extends to the low-and-reverse servo 56.

Control pressure from passage 116 is distributed across 3-way check valve 148 to passage 150 which extends to the 2-3 shift valve. When the 2-3 shift valve is in the position shown in FIG. 2B, communication between passage 150 and direct clutch feed passage 152 is interrupted. When the valve is shifted in a downward direction upon an increase in governor pressure in passage 140, communication is established between passages 150 and 152.

The tendencies for the shift valves 128 and 142 to shift from their downshift positions to their upshift positions is opposed by reduced throttle pressure in passage 154. This pressure is developed by a 2-3 delaying and 2-3 throttle reducing valve 156 which is supplied with output pressure from the throttle booster valve 158. The throttle booster valve develops a pressure which is an indicator of engine torque and the 2-3 delaying and 2-3 throttle reducing valve modulates that pressure to produce a pressure force on each of the shift valves acting in an upward direction which opposes governor pressure. The throttle booster valve is supplied with a so-called throttle pressure from throttle pressure passage 160 which is developed by throttle pressure regulator valve 162. This valve is actuated by a vacuum diaphragm assembly of the kind described in the previously mentioned Duffy and Searles patents to modulate the pressure in passage 92 and to effect an engine load proportional pressure in passage 160. The pressure in passage 160 is distributed across the compensator valve 164 to the throttle pressure booster valve 158. That valve receives control pressure from passage 92 thus causing the throttle pressure in passage 160 to be amplified when the engine manifold pressure is high thus causing a generally linear relationship between engine throttle movement and the magnitude of the pressure made available to the 1-2 shift valve and the 2-3 shift valve for shift delay purposes.

The throttle pressure in passage 160 acts on land 166 of the compensator valve 164. Line pressure is applied to the valve 164 through the passage 168 and is modulated by the compensator valve to produce a compensator pressure in passage 170 that acts on the lower end of the main regulator valve thus causing a cutback in the regulated oil pressure level. The pressure in passage 170 decreases upon an increase in the pressure in passage 160 thereby effecting an increase in the pressure maintained by the main oil pressure regulator.

As indicated previously, the 2-3 shift valve, on upshift from the intermediate ratio to the high speed ratio, moves in a downward direction thus connecting passages 152 and 150. This also exhausts passage 170 extending to the 1-2 shift accumulator valve 172. Thus the release side of the servo 54 is exhausted through passage 174 and the exhausted passage 170, the 1-2 shift accumulator valve acting as a part of the exhaust fluid flow path. As the release side of the intermediate servo 54 becomes exhausted, the pressure on the apply side of the servo 54 applies the servo by reason of a connection between control pressure passage 176 extending from the manual valve 90 and through the 1-2 band transmission valve 178 to the passage 180 leading to the apply side of the servo 54.

Passage 182 extends from the manual valve 90 and is pressurized in each of the three forward driving ranges. It functions as a pressure feed passage for the forward clutch 88. Passage 182 extends to forward clutch regulator valve 120, seen in FIG. 2B and FIG. 3. Regulator valve 120 comprises a valve spool 184 having spaced valve lands 186 and 188. It is urged in a left hand direction by valve spring 190 seated on a stationary valve bore plug 192. Valve 120 includes a valve port 194 that communicates with the passage 182 and a valve port 196 which communicates with the forward clutch 88 through feed passage 198. A feedback passage 200 extends from the passage 198 to the left hand side of the valve spool 184.

A forward clutch regulator valve switch valve 202 acts in cooperation with regulator valve 120. Preferably it is located in a common bore with valve 120. It includes valve spool 204 having spaced lands 206 and 208 and three ports shown at 210, 212 and 214, the latter being an exhaust port. Port 210 communicates with passage 182; and when the valve 202 is positioned as shown, it is in fluid communication with port 212 and crossover passage 216 extending to the regulator valve 120. When the valve 202 is shifted in a left hand direction against the opposing force of the valve spring 218, port 212 is brought into fluid communication with exhaust port 214. Spring 218 seated on the stationary plug 192. Valve 202 is adapted to be shifted in a left hand direction, as viewed in the drawings, by a solenoid actuator 220 comprising solenoid windings 222 and an armature 224. When the solenoid windings are energized, armature 224 shifts in a left hand direction thus shifting the valve 202 against the force of spring 218.

When the solenoid is deactivated the spring shifts the valve 202 to the position shown in the drawings.

The electric circuit for the solenoid windings comprises a lead 222 which extends to a battery; e.g., a twelve volt car battery 224. The electric circuit for the solenoid can be interrupted by series related brake switch 226 and throttle switch 228. Brake switch 226 is closed when the vehicle brakes are applied. Throttle switch 228 is closed when the vehicle carburetor throttle valve is closed. The circuit thus is open when the brakes are released or the throttle is advanced and is closed when the throttle is closed and the brakes are applied.

When the valve 184 assumes the position shown in the drawings, a direct connection is established through valve 120 between passages 182 and 198. Forward clutch thus acts in the usual fashion and is pressurized whenever the manual valve is in the "1" position, the "2" position or the "D" position. Passage 216 also is pressurized when the valve 202 is in the position shown. Thus the valve 120 has two pressure ports and a single outlet port, the latter being port 196. If, however, the valve 202 is shifted in a left hand direction, port 212 becomes connected directly to exhaust port 214 thereby exhausting passage 216. Port 230 in the valve 120 thus becomes an exhaust port rather than a pressure supply port. In these circumstances valve 120 functions as a regulator valve for maintaining a threshold pressure level in the forward clutch 88. The pressure for which valve 120 is calibrated is sufficient to overcome the initial spring force in the forward clutch servo 88 and cause the piston of the servo 88 to stroke to a point of incipient clutch engagement although the pressure in the clutch at that stage is not sufficient to engage the clutch. If valve 120 again ceases to function as a regulator valve and establishes a direct connection between passage 182 and passage 198, the clutch servo 88 immediately will become fully engaged with no accumulating effect caused by the stroking of the clutch servo piston.

Governor pressure in passage 232 extends to the valve 202. It acts on valve spool 202 to urge it in the right hand direction. Passage 232 communicates with governor presssure passage 140 as shown in FIG. 2B.

The regulator valve 120 is fed by the forward clutch circuit downstream of all the control functions of the other valve elements in the circuits so that only the forward clutch is affected by the valve structure shown in FIG. 3. This circuit is not pressurized when the manual valve is in the "R" or "N" positions. In the chart below this condition is identified as operating modes 2 and 3. Mode 1 in the chart below identifies a park condition which results from shifting the manual valve to the extreme left hand position P shown in FIG. 2A.

| No. | Range | Speed | Throttle | Brake | Capacity |
|---|---|---|---|---|---|
| 1 | P | | | | 0 |
| 2 | R | | | | 0 |
| 3 | N | | | | 0 |
| 4 | D | 0 | 0 | On | Red. |
| 5 | D | <25 MPH | | On | Red. |
| 6 | D | <25 MPH | Off Idle | On | Full |
| 7 | D | >25 MPH | | | Full |
| 8 | 2 | | | | Full |
| 9 | 1 | | | | Full |

The system is effective to function so that a vehicle speed of 25 miles per hour will be the critical speed that separates the drive modes. When the transmission is operating in the "D" range with speeds above 25 miles per hour, the governor pressure is sufficient to overcome the effect of the solenoid even if the brake switch is closed and the engine throttle is closed. In the "D" range below 25 miles per hour, the governor pressure is insufficient to overcome the solenoid force even with the assistance of the spring 218. At closed throttle with the brakes applied, both switches 226 and 228 are closed, thereby allowing the solenoid to force the valve 202 in a left hand direction. This opens exhaust port 214, thereby connecting port 212 and passage 216 to exhaust. With port 194 pressurized and port 230 exhausted, the pressure in the forward clutch is a reduced modulated pressure. This condition satisfies modes 4 and 5 in the preceding chart.

If the manual valve is in the "D" position with the brakes applied and the throttle switch 228 opened, the solenoid circuit is broken and spring 218 forced valve 202 to the right hand position. Port 210 then feeds line pressure into port 212 and passage 216. When the valve 120 moves to open port 230, line pressure then will flow into port 196 and feedback passage 200 thereby blocking the regulating action of valve 120. This fulfills operating mode 6 in the preceding table.

If the manual valve is in the "D" position and the vehicle speed is above 25 miles per hour, the governor pressure in pasage 232 in combination with the force of spring 218 will overcome the force of the solenoid and valve 120 will remain blocked with port 196 subjected to line pressure despite the positions of the switches 226 and 228. This fulfills mode 7 in the preceding table.

If the manual valve is in the "1" position or the "2" position, line pressure is fed by the manual valve to port 234 of the valve 120. Control pressure is distributed to port 234 from passage 236. This forces the valve 120 to the left and causes port 196 to be subjected to line pressure as it is brought into communication with port 194. This fulfills modes 8 and 9 in the preceding table.

INDUSTRIAL APPLICABILITY

This invention is adapted to be used in drivelines for wheeled vehicles that employ an internal combustion engine and an automatic power transmission mechanism having control valves that respond to vehicle speed and engine load or throttle setting to produce shift functions, especially automatic transmissions having hydrokinetic converters or fluid couplings adapted to be connected continuously to the vehicle engine.

I claim:

1. In a power transmission mechanism for a wheeled vehicle driveline including a hydrokinetic unit with a throttle-controlled engine driven impeller and a turbine:
   a multiple ratio gear system including a torque input shaft connected to the turbine of said hydrokinetic unit;
   clutch means and brake means for controlling the motion of gear elements of said gear system to effect multiple forward drive ratios, said brake means including a forward drive clutch that is engaged during operation in a forward drive mode;
   a control system for effecting engagement and release of said clutch means and brake means including a pressure source and a governor valve means for developing a governor pressure that indicates driven speed;
   a forward clutch regulator valve in said control system between said pressure source and said forward drive clutch, said regulator valve having a pressure inlet port, a forward drive clutch pressure feed port and an exhaust port said regulator valve having formed thereon a valve land with a pressure area on one side thereof, a pressure feedback passage establishing communication between said clutch pressure feed port and said pressure area, spring means for applying a force on said regulator valve that opposes the pressure feedback force on said regulator valve;
   a switch valve in fluid communication with said regulator valve comprising a pressure inlet port, a pressure outlet port and an exhaust port, said outlet port communicating with the exhaust port of said regulator valve;
   a solenoid actuator means for effecting shifting of said switch valve to a first position to connect the exhaust ports of said regulator valve and said switch valve thus enabling said regulator valve to control pressure at said pressure outlet port of said regulator valve and to a second position to connect the exhaust port of said regulator valve to the outlet port of said switch valve thereby disabling the pressure regulating action of said regulator valve and establishing communication between the outlet port of said switch valve and the outlet port of said regulator valve;
   said governor valve means being connected to said switch valve to oppose movement of the latter to said first position; and
   wheel brake switch responsive to wheel brake actuation and a throttle switch responsive to engine throttle movement in series relationship with respect to said solenoid actuator means.

2. The combination as set forth in claim 1 wherein said valve spring of said regulator valve is adapted to oppose fluid pressure forces acting on said regulator valve to establish a threshold pressure level in said forward clutch when the latter is disengaged upon wheel brake actuation and engine throttle relaxation.

3. The combination as set forth in claim 1 wherein said switch valve includes a valve spring that normally urges the same toward said second position to supplement the governor pressure force acting thereon.

4. The combination as set forth in claim 2 wherein said switch valve includes a valve spring that normally urges the same toward said second position to supplement the governor pressure force acting thereon.

5. The combination as set forth in claim 1 wherein said regulator valve and said switch valve include separate valve spools located in a common valve bore.

6. The combination as set forth in claim 2 wherein said regulator valve and said switch valve include separate valve spools located in a common valve bore.

7. The combination as set forth in claim 3 wherein said regulator valve and said switch valve include separate valve spools located in a common valve bore.

* * * * *